United States Patent [19]

Pano

[11] Patent Number: 4,992,008

[45] Date of Patent: Feb. 12, 1991

[54] CUTTING INSERT

[75] Inventor: Joseph Pano, Nahariya, Israel

[73] Assignee: Iscar Ltd., Nahariya, Israel

[21] Appl. No.: 547,391

[22] Filed: Jul. 3, 1990

Related U.S. Application Data

[63] Continuation of Ser. No. 235,924, Aug. 23, 1988, abandoned.

[30] Foreign Application Priority Data

Oct. 2, 1987 [IL] Israel .......................... 84078

[51] Int. Cl.⁵ ............................. B23P 15/20
[52] U.S. Cl. .................. 407/114; 407/115; 407/116
[58] Field of Search .............. 407/116, 113, 114, 115

[56] References Cited

U.S. PATENT DOCUMENTS

| 4,214,846 | 7/1980 | Kraemer | 407/114 |
| 4,334,808 | 6/1982 | Seidel | 407/114 |
| 4,583,887 | 4/1986 | Wertheimer | 407/116 |
| 4,859,122 | 8/1989 | Patterson et al. | 407/116 |

Primary Examiner—Frederick R. Schmidt
Assistant Examiner—Lawrence Cruz
Attorney, Agent, or Firm—Burgess, Ryan & Wayne

[57] ABSTRACT

A polygonally shaped metal cutting insert having top, bottom, front, rear and side faces with corresponding front and side cutting edges, chip forming means being located on the top face within an area defined by the cutting edges and comprising a front chip deflector surface spaced from the cutting edges, projecting out of the top surface and directed along the length of one of the side cutting edges and first and second side chip deflector surfaces spaced from the cutting edges, projecting out of the top surface and respectively directed along the lengths of the side cutting edges.

12 Claims, 4 Drawing Sheets

CUTTING INSERT

This application is a continuation of application Ser. No. 235,924, filed Aug. 23, 1988, now abandoned.

FIELD OF THE INVENTION

This invention relates to a cutting insert formed of a hard wear-resistant material such as for example, a cemented hard metal carbide and intended for use in metal grooving parting, turning or boring operations.

BACKGROUND OF THE INVENTION

Such inserts are generally of the replacable kind and are designed to be firmly held in an appropriate receiving seat formed in an insert holder. Thus, for example, the insert can be formed with a tapering wedge-shaped body so as to be wedge clamped within a correspondingly wedge-shaped slot formed in the insert holder. Alternatively, the insert can be clamped between a pair of jaws of the insert holder which jaws define a receiving slot, the jaws being biased into clamping the insert by suitable mechanical means.

Seeing that the metal cutting operations involve the removal (from the workpiece being cut) of metal, in the form of chips, the interests of safety and efficiency of cutting require that these chips be effectively removed from the cutting region. To this end it has long been known to provide such cutting inserts with chip breaking and/or chip forming means so as to ensure that the chips shortly after their formation, are so shaped and/or broken that they can be readily removed from the work area without interfering with the continuing cutting process and without endangering the operating personnel.

In the use of such cutting inserts for the purposes indicated, it has long been known to draw a distinction between tools for parting or grooving operations on the one hand, and tools for lateral turning (e.g. cylindrical) operations on the other hand. In the first instance, there is a radial movement of the tool into the rotating workpiece to be grooved or parted whilst, in the second instance, there is a lateral or transverse movement of the tool. When carrying out these differing kinds of operations, it has long been known that it is necessary to replace the holder and the cutting insert when passing from one operation to the other, seeing that the cutting insert employed for any particular operation is designed so as to meet only the requirements of that operation.

This necessity to replace the cutting insert in accordance with the nature of the cutting operation is clearly time-consuming and requires the ready availability of differing kinds of holders and cutting inserts for differing kinds of operations. In the light of this existing situation, the applicants have developed a new tool cutting system known by the applicants' trademark CUT-GRIP, wherein the same cutting insert can be used for both parting and grooving operations, on the one hand, and also for lateral turning operations, on the other hand. Such an insert will hereinafter be referred to as a "multidirectional cutting tool insert".

With the use of such multidirectional cutting tool inserts, the problem arises of effectively controlling the formation of chips whether these arose from radially directed parting or grooving operations or from laterally directed turning operations.

BRIEF SUMMARY OF THE INVENTION

It is therefore an object of the present invention to provide a new and improved multidirectional cutting tool insert with effective chip control means.

According to the present invention there is provided a polygonally shaped metal cutting insert having top and bottom faces and front, rear and a pair of side peripheral faces; a front cutting edge formed at the intersection of the top face and the front peripheral face and first and second side cutting edges formed respectively at the intersections of the top face and the two side peripheral faces; chip forming means located on the top face within an area defined by the cutting edges and comprising a front chip deflector surface spaced from the cutting edges' projecting out of the top surface and directed along the length of the first cutting edge and first and second side chip deflector surfaces spaced from the cutting edges, projecting out of the top surface and respectively directed along the lengths of the first and second side cutting edges.

Preferably, the front chip deflector surface is formed of a pair of spaced apart, component, front chip deflector surfaces which, together with the first and second chip deflector surfaces, constitute surfaces of a pair of chip deflector ridges extending along a leading end of the top face respectively in the directions of the side cutting edges and being spaced therefrom.

In accordance with a preferred embodiment of the present invention, the insert is provided with a pair of opposite cutting ends located either at diametrically opposite ends thereof or at opposite ends of a top face, each cutting end having the structure as defined above in accordance with the invention. With such double ended inserts the portions of the top and bottom faces, which are designed to be clamped between jaws of a tool holder, are preferably parallel and in order to ensure unimpeded insertion and removal of the insert from the top holder it is essential that the chip deflector ridges do not project beyond the preferably parallel planes defined by the clamped portions of the insert.

With such a cutting insert, in accordance with the present invention, when it is used in a radially directed parting or grooving operation the chips which are formed are shaped by the front chip deflector surfaces so as to acquire a substantially corrugated cross section. This leads to the narrowing of the chips (thus allowing for the continued grooving without the chips interfering therewith) and also allowing for the rigidizing of the chips and their eventual breaking. When, however, laterally directed turning operations are carried out, then the provision of the side chip deflector surfaces is effective in ensuring chip breaking over a wide range of operating conditions, thereby allowing for the carrying out of both preliminary and finishing operations with the same tool. This is of particular importance when the tool cutting operations are carried out with automatic machines, reducing the operating time and the number of tools which may be required.

BRIEF SUMMARY OF THE DRAWINGS

For a better understanding of the present invention, and to show how the same may be carried out in practice, reference will now be made to the accompanying drawings, in which FIGS. 1a and 1and respectively side and top elevations of a tool cutting insert of a kind to which the invention is applied, shown clamped in a tool holder.

DETAILED DESCRIPTION OF SPECIFIC EMBODIMENTS

Figure 1A:
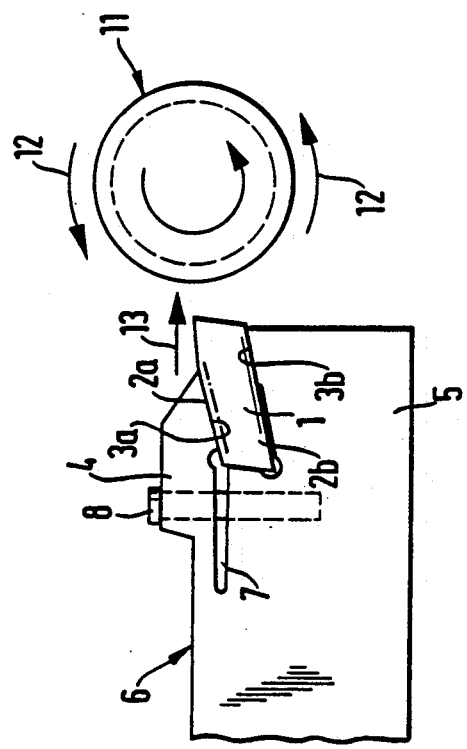

Reference will first be made to FIG. 1 of the drawings, wherein is illustrated the mode of mounting of a multidirectional tool insert in a tool support and the use of this insert for radially directed grooving operations and laterally directed turning operations. As can be seen in the figure, a multidirectional cutting tool insert 1 (the detailed possible constructions of which will be described below with reference to the remaining figures), having a pair of longitudinally parallel upper and lower surfaces 2a and 2b, is clamped between corresponding parallel surfaces 3a and 3b of jaws 4 and 5 formed integrally with a tool holder body 6, the surfaces 3a and 3b defining a receiving slot designed to receive the insert 1. This receiving slot communicates with a rearwardly directed slit 7, the provision of which allows for the necessary resilience required for clamping. The insert 1 is firmly clamped within the receiving slot by means of a clamping screw 8 which, when tightened, causes the jaws 4 and 5 clampingly to bear against the corresponding surfaces 2a and 2b of the insert. The surfaces 2a and 2b are respectively formed with longitudinally extending V-shaped faces in which mate corresponding convex V-shaped ribs formed of the corresponding jaw surfaces 3a and 3b. By virtue of the concave to convex mating of the ribs of the jaws 4 and 5 with the surfaces 2a and 2b, lateral movement of the insert with respect to the insert holder 6 is prevented.

As seen in the drawings, the tool is designed for use in machining a cylindrical workpiece 11 which is designed to be rotated by a workpiece holder (not shown) in the direction of the arrows 12. When it is desired to perform a grooving or parting operation, then the movement of the tool is along the direction of the arrow 13, i.e. radial with respect to the workpiece. When, however, the tool is used to effect a turning operation, then the tool moves in a transverse direction as seen in FIG. 1b.

Figure 2:
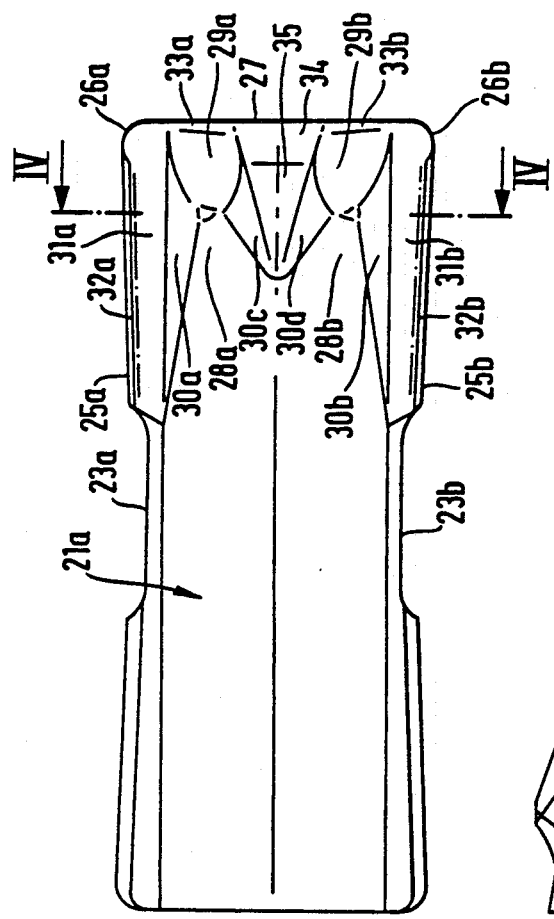
FIG. 2 is a top elevation of a multidirectional cutting tool insert in accordance with the present invention.
Figure 3:
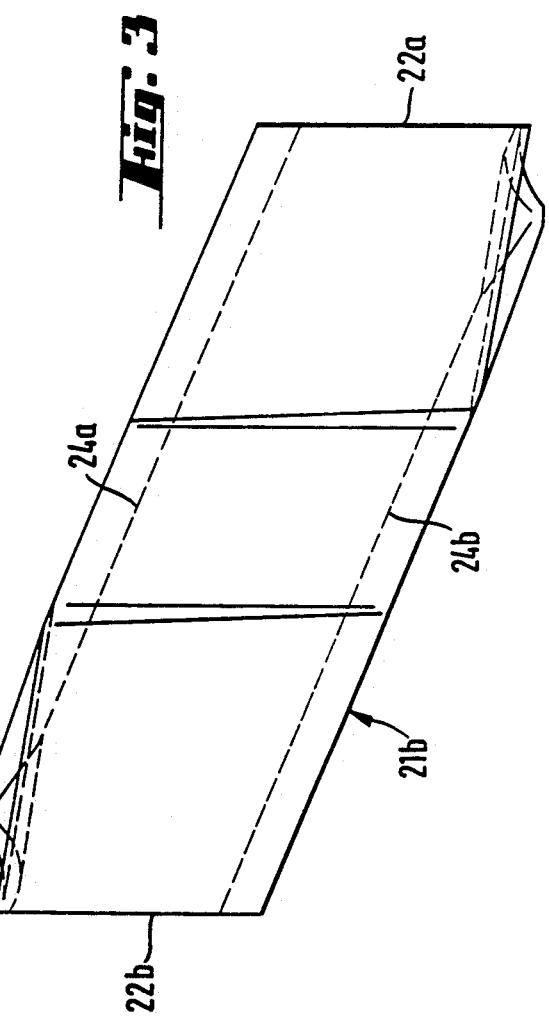
FIG. 3 is a side elevation of the cutting tool insert shown in FIG. 2.
Figure 4:
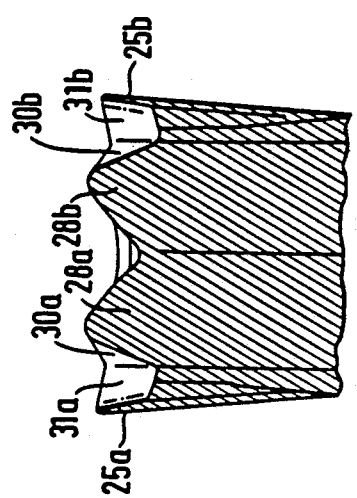
FIG. 4 is a cross-sectional view of the insert shown in FIG. 2 taken along the line IV—IV.

Reference will now be made to FIGS. 2 to 4 of the drawings for a detailed description of a first embodiment of a cutting insert in accordance with the invention. As seen in the drawings, the cutting insert consists of a polygonal body of substantially parallelepiped shape. The insert has top and bottom faces 21a and 21b, front and rear peripheral faces 22a and 22b and side peripheral faces 23a and 23b. The top and bottom faces 21a and 21b are formed with longitudinally extending concave keying grooves 24a and 24b of V-shaped cross-section.

The insert is formed at diametrically opposite corners thereof with respective cutting ends which, when the insert is mounted in the insert holder as shown in FIG. 1 of the drawings, are alternately exposed for use. The cutting ends are of identical construction and one of them will now be described. At the intersection of the top face 21a and the peripheral faces 23a and 23b are formed first and second side cutting edges 25a and 25b which respectively extend from insert corners 26a and 26b to an intermediate position along the insert. Formed at the intersection of the top face 21a and the front peripheral face 22a is a front cutting edge 27 which extends between the corners 26a and 26b.

The surfaces of the keying groove 24a terminate in a pair of ridges 28a and 28b having respective front surfaces constituting component front chip deflector surfaces 29a and 29b, outer side surfaces constituting first and second outer side chip deflector surfaces 30a and 30b and inner side surfaces constituting inner side chip deflector surfaces 30c and 30d. The side chip deflector surface 30a extends in the direction of the cutting edge 25a and is spaced therefrom by a positive rake surface 31a which merges with the cutting edge 25a via a land surface 32a which can be of varying width, preferably increasing in width from the corner 26a to the intermediate position of the insert. Similarly, the side chip deflector surface 30b is separated from the cutting edge 25b by a positive rake surface 31b and a land surface 32b.

The component front chip deflector surfaces 29a and 29b merge with the front cutting edge 27 via land surfaces 33a and 33b. Preferably the land surfaces 33a and 33b vary in width, widening towards the positive rake surface 34. Intermediate the component front chip deflector surfaces 29a and 29b the cutting edge 27 merges with a positive rake surface 34 which, in its turn, merges with a concave chip path surface 35.

In use, and when the cutting insert is used in a radially directed grooving operation, the chip which is cut by the cutting edge 27 and which is initially of a width equal to the width of the groove, encounters and passes over the front chip deflector surfaces 29a and 29b and side deflector surfaces 30a, 30b, 30c and 30d whilst the central portion and longitudinal edges of the chip are free to pass down the positive rake surfaces 34, 31a and 31b. The chip is thereby deformed, acquiring a corrugated shape which results in the chip becoming narrowed and rigidized. In this way the chip easily flows through and out of the groove and, as a consequence of residual stresses enhanced by the deflectors, is curled into a spiral and breaks for ready disposal.

On the other hand, when the insert is used for turning in a transverse direction, the chips which are cut by the side cutting edges 25a or 25b pass over the variable width lands 32a and 32b down the positive rake surfaces 31a and 31b, to be deflected upwardly by the side deflector surfaces 30a and 30b. Upon striking these deflector surfaces, the chips are in fact deflected in the direction of the side peripheral faces 23a and 23b, which they eventually strike below and longitudinally displaced away from the cutting edge so as to become broken.

Figure 5:
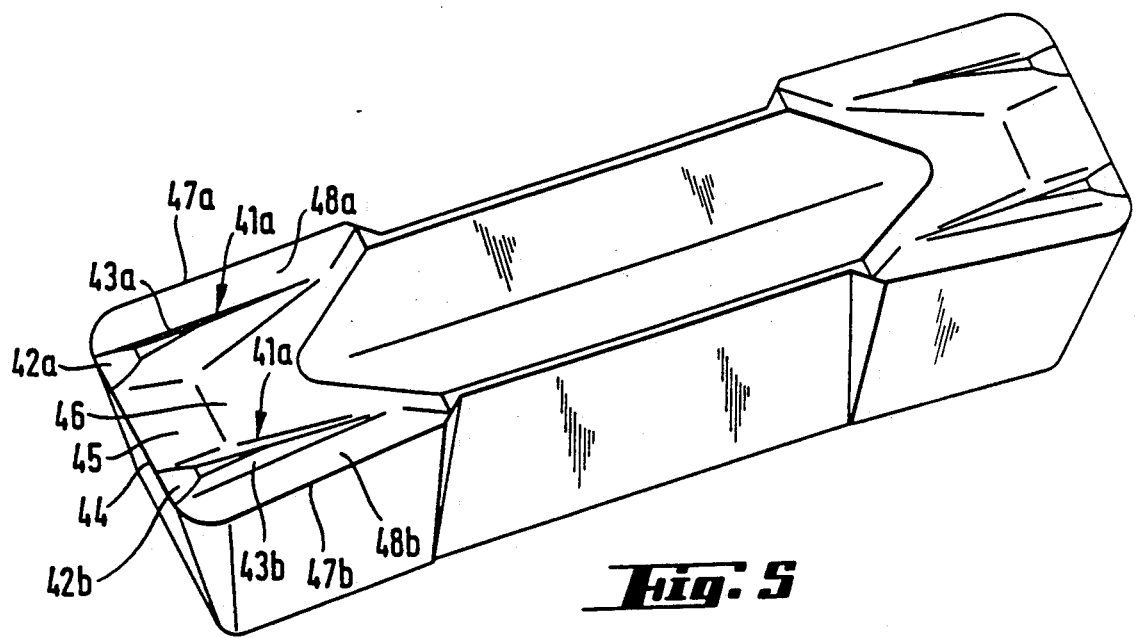
FIG. 5 is a perspective view of a second embodiment of an insert in accordance with the present invention.

In a modified form of insert in accordance with the invention, as shown in FIG. 5 of the drawings, the insert has cutting ends formed at either end of a top face thereof. In this case, however, each cutting portion has chip forming means constituted by ridges 41a and 41b, having component front chip deflector surfaces 42a and 42b and first and second side chip deflector surfaces 43a and 43b. In this case a front cutting edge 44 merges directly with the component front deflector surfaces 42a and 42b whilst the ridges 41a and 41b are separated along the width of the insert by a rake surface 45 and a concave chip path surface 46. Preferably the rake surface 45 is effectively "twisted", i.e. the rake becomes less positive as it extends from the front cutting edge. The side cutting edges 47a and 47b merge directly with positive rake surfaces 48a and 48b.

Figure 6:
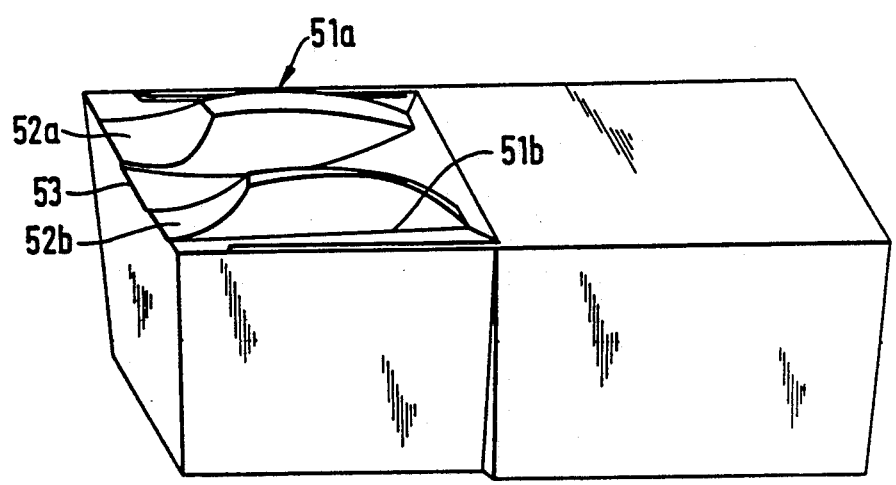
FIG. 6 is a perspective view of a third embodiment of an insert in accordance with the present invention.

In the modified embodiment shown in FIG. 6 of the drawings, the insert is shown with a cutting portion having ridges 51a and 51b of which the component front deflector surfaces 52a and 52b extend continuously from a front cutting edge 53 and are of a concave disposition.

Figure 7C:
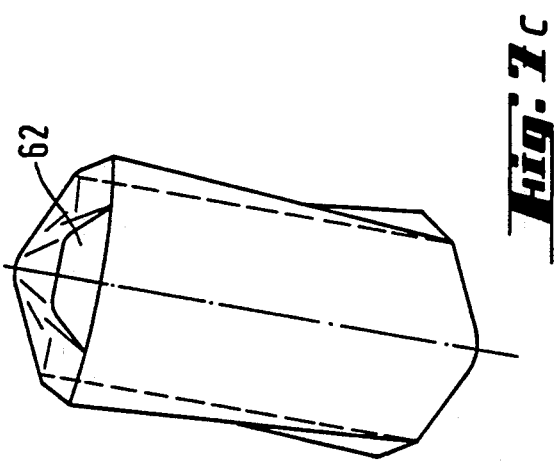
FIGS. 7a 7b and 7c are respective plan, side and front views of a fourth embodiment of an insert in accordance with the present invention.
Figure 7B:
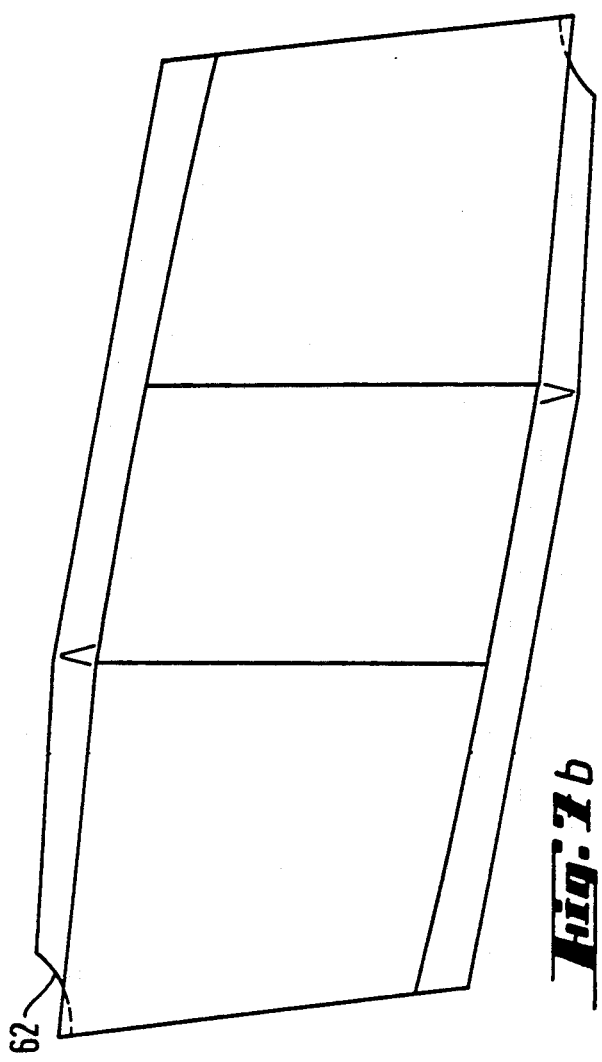
Figure 7A:
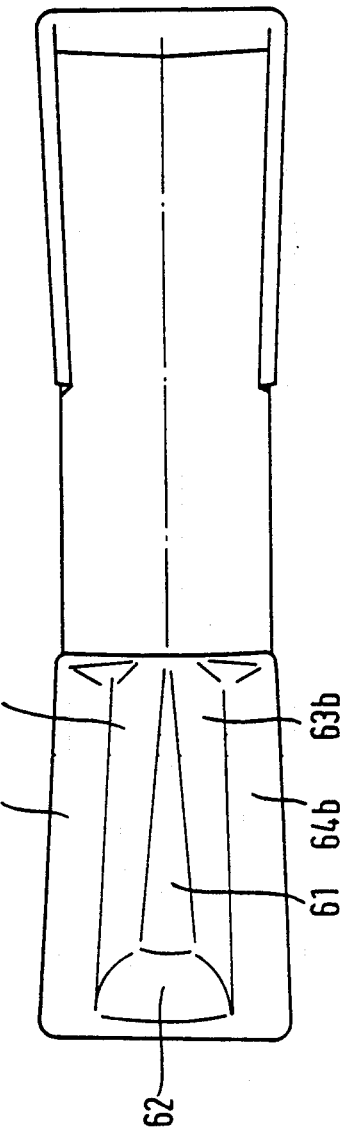

In a still further modified embodiment shown in FIG. 7 of the drawings, the separate ridges which have been described with reference to the preceding drawings, have now merged into a single central ridge 61 having a single front chip deflector surface 62 and a pair of side chip deflector surfaces 63a and 63b, the latter being spaced from the corresponding side cutting edges by appropriate positive rake surfaces 64a and 64b. The single ridge extends in width over at least one third of the width of the insert and in grooving operations the chip is deformed by its central portion striking the front chip deflector surface whilst its longitudinal side portions pass over the side positive rake surfaces and are therefore not so impeded.

Figure 1B:
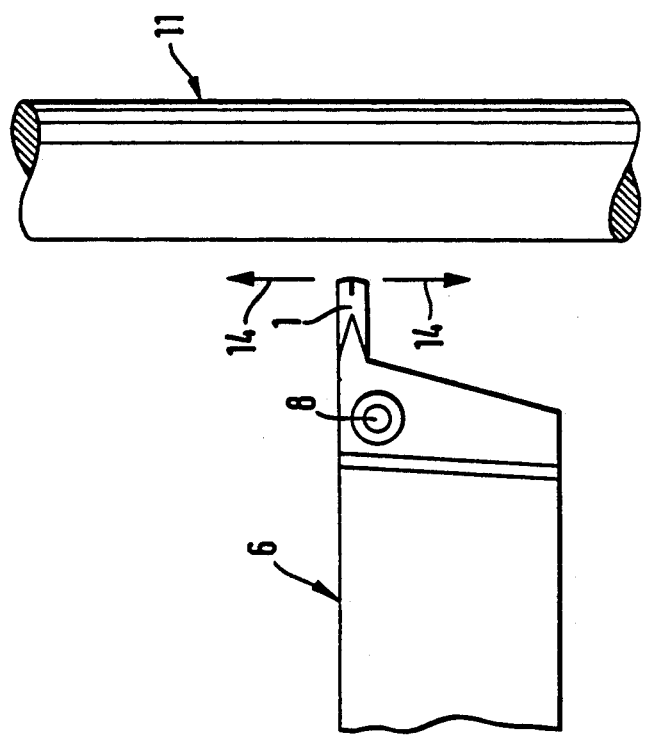

It will be seen that in connection with all the embodiments of the insert in accordance with the invention and as described above, the portion of the insert to the rear of the cutting end (i.e. the portion which is inserted and held in the toll holder) is inclined with respect to the cutting ends and is designed to be held in an appropriately inclined slot formed in the tool holder (see FIG. 1a). This feature helps to ensure that whilst, on the one hand, the upper clamping jaw 4 of the tool holder as seen in FIG. 1 can be of substantial depth (and therefore strength), on the other hand the front edge thereof can be sufficiently inclined with respect to the direction of chip flow so as to minimize resistance to chip flow.

Furthermore, in all the embodiments described above the chip forming means can include, in the regions between the side cutting edges and the side deflector surfaces, discrete projecting abutments and/or recesses. These are particularly effective in the deformation of chips of metals of a high degree of plasticity which must be radically deformed before they can be broken.

Whilst in the embodiments described above the various cutting edges have in some cases been illustrated as merging with positive or negative rake surfaces via land surfaces, it will be appreciated that, where appropriate, such land surfaces can be dispensed with.

It will furthermore be appreciated that, with multidirectional cutting inserts as described above in accordance with the present invention, it is possible effectively to use the same tool and the same insert for grooving and for lateral turning operations ensuring efficient chip forming and breaking.

I claim:

1. A polygonally shaped metal cutting insert for use in parting or grooving operations and turning in a separate operation comprising top and bottom faces and front, rear and a pair of side peripheral faces; a front cutting edge formed at the intersection of the top face and the front peripheral face for use in the parting and grooving operations and first and second side cutting edges formed respectively at the intersections of said top face and the two side peripheral faces for use in the separate turning operation; chip forming means located on said top face within an area defined by said cutting edges and comprising a pair of spaced apart chip deflector ridges extending longitudinally along a front end of said top face and projecting therefrom above the level of the cutting edges, each ridge being formed with a front deflector surface with a side deflector surface, the front deflector surfaces being spaced apart symmetrically with respect to a longitudinally directed median axis of the insert, being located in the vicinity of the front cutting edge and being respectively spaced from said front cutting edge by a pair of front rake surfaces, said side deflector surfaces extending respectively along the lengths of said cutting edges and being respectively spaced therefrom by side rake surfaces.

2. An insert according to claim 1 characterized in that a region of said top face intermediate said ridges merges with an intermediate portion of said front cutting edge via a positive rake surface, and said front deflector surfaces are spaced from the front cutting edge via negative rake surfaces.

3. An insert according to claim 1 characterized in that said side cutting edges merge with said deflector surfaces via positive rake surfaces.

4. An insert according to claim 2 characterized in that said front cutting edge merges with positive rake surfaces on either side of said ridges.

5. An insert according to claim 2 characterized in that said positive rake surface, intermediate said ridges merges with a chip path surface directed upwardly with respect top the top face.

6. An insert according to claim 5, characterized in that said chip path surface is directed substantially parallel to said side cutting edges.

7. An insert according to claim 1 characterized in that said front deflector surfaces are of concave arcuate shape.

8. An insert according to claim 3 characterized in that said positive rake surfaces become progressively less positive in a direction away from said front cutting edge.

9. An insert according to claim 1 characterized in that inner surfaces of said ridges merge along a median line of said top face.

10. An insert according to claim 1 characterized in that said chip forming means is formed adjacent opposite ends of the insert.

11. An insert according to claim 10 characterized in that said cutting ends are formed at opposite ends of said top face.

12. An insert according to claim 10, characterized in that said cutting ends are formed respectively at opposite ends of said top and bottom faces.

* * * * *